United States Patent [19]

Leth Moller: Per et al.

[11] Patent Number: 5,356,450
[45] Date of Patent: Oct. 18, 1994

[54] PROCESSS AND APPARATUS FOR MAKING MINERAL WOOL FIBRES

[75] Inventors: Leth Moller: Per; Svend Grove-Rasmussen, both of Roskilde; Bruno Friis Rasmussen, Hedehusene, all of Denmark

[73] Assignee: Rockwool International A/S, Denmark

[21] Appl. No.: 30,016

[22] PCT Filed: Sep. 30, 1991

[86] PCT No.: PCT/EP91/01862
§ 371 Date: May 5, 1993
§ 102(e) Date: May 5, 1993

[87] PCT Pub. No.: WO92/06047
PCT Pub. Date: Apr. 16, 1992

[30] Foreign Application Priority Data

Sep. 28, 1990 [GB] United Kingdom ............... 9021168
Sep. 28, 1990 [GB] United Kingdom ............... 9021169
Jan. 16, 1991 [GB] United Kingdom ............... 9100883

[51] Int. Cl.$^5$ ............................................. C03B 37/05
[52] U.S. Cl. ............................................. 65/456; 65/518
[58] Field of Search ............................... 65/6, 14, 15

[56] References Cited

U.S. PATENT DOCUMENTS

| | | | |
|---|---|---|---|
| 3,285,722 | 11/1966 | Levecque et al. | 65/15 |
| 3,709,670 | 1/1973 | Eriksen | 65/8 |
| 4,105,425 | 8/1978 | Nielsen et al. | 65/14 |
| 4,541,854 | 9/1985 | Shonharr et al. | 65/14 |
| 5,116,397 | 5/1992 | Narmi et al. | 65/14 |
| 5,131,935 | 7/1992 | Debouzie et al. | 65/6 |

FOREIGN PATENT DOCUMENTS

| | | |
|---|---|---|
| 0439385 | 7/1991 | European Pat. Off. |
| 2106430 | 5/1972 | France |
| 2322114 | 3/1977 | France |
| 867299 | 5/1961 | United Kingdom |
| 8807980 | 10/1988 | World Int. Prop. O. |

Primary Examiner—Robert L. Lindsay
Attorney, Agent, or Firm—Brumbaugh, Graves, Donohue & Raymond

[57] ABSTRACT

Apparatus for the formation of mineral wool fibres comprising a set of rotors (1) mounted on a front face (2) of a housing (3) wherein a rotor (5, 6, 7) has associated with it an air supply slot (8, 9, 10) for discharging an air blast close to the periphery of the rotor with an axial component for carrying off the mineral wool fibres and wherein the air slot has direction means (25) to direct the air at an angle to the axial direction that varies along the length of the slot.

14 Claims, 3 Drawing Sheets

PROCESSS AND APPARATUS FOR MAKING MINERAL WOOL FIBRES

It is known to make mineral wool fibres from a mineral melt using an apparatus comprising a housing having a front face, a set of fiberising rotors each mounted on the front face for rotation about a different substantially horizontal axis and arranged such that when the rotors are rotating melt poured on to the periphery of the top rotor in the set is thrown on to the periphery of the subsequent rotor, or on to the periphery of each subsequent rotor in sequence, in the set and mineral wool fibres are thrown off the or each subsequent rotor, and means for collecting the mineral wool fibres comprising, associated with the or each said subsequent rotor, an air supply slot extending through the front face of the housing around and close to the periphery of that rotor for discharging an air blast close to and substantially parallel to the periphery with an axial component for carrying the mineral wool fibres axially off that periphery, and direction means for selecting the angle of the discharged air relative to the axial direction.

Apparatus of this general type is described in GB 1,559,117. In particular that describes one system in which the air direction means are blades on the periphery of the rotor and that rotate with the rotor and thus give a tangential component to the air supply that is the same as the rotational speed of the rotor. That patent does, however, also describe that the direction means can be blades mounted in the slot and that this makes it possible to vary the flow of air and its direction along the periphery of the rotor. Thus, instead of the tangential velocity of the air being dictated by the rotational speed of the rotor, it can be dictated by the choice of the angle at which the blades are set. Instead of the flow of air being uniform around the entire rotor, the slot can be closed or reduced in some areas so as to reduce the flow of air in those areas. In particular, it is possible to close the flow of air in the interspace between the rotors where the melt flows from one rotor to the next, so as to reduce the disturbing and cooling effect on the flow of melt. The inference therefore is that the slot containing the blades should extend around most at least of the remainder of the periphery of each of the rotors. As a consequence, the slots will extend between lower adjacent parts of the lowermost pair of rotors.

When manufacturing mineral wool fibres binder is usually sprayed into the fibres as they are carried axially away from the set of rotors, and it is desirable to obtain the best possible distribution of binder with the fibres.

Some shot or coarse fibre is normally thrown off the set of rotors and can be collected in a pit positioned beneath and slightly in front of the set of rotors, just before a conveyor or other suitable carrier for removing the mineral wool from the chamber containing the rotors. The shot and coarse fibres are collected in the pit and recycled to the melt. It is naturally desirable to minimise the amount of good quality fibres that are collected in the pit.

According to the invention apparatus for the production of mineral wool is provided which comprises a housing having a front face, a set of rotors each mounted on the front face of the housing for rotation about a different substantially horizontal axis and arranged such that when the rotors are rotating mineral melt that is poured on to the periphery of the top rotor in the set is thrown on to the periphery of the subsequent rotor, or each subsequent rotor in sequence, in the set and mineral wool fibres are thrown off the or each susequent rotor, means for collecting the mineral wool fibres comprising, associated with the or each subsequent rotor, an air supply slot extending through the front face of the housing around and close to that rotor for discharging an air blast close to and substantially parallel to the periphery of the rotor with an axial component for carrying the mineral wool fibres axially off that periphery, and direction means for selecting the angle of the discharged air relative to the axial direction, characterised in that the direction means in at least the slot associated with the final rotor in the set are arranged to direct the air at an angle to the axial direction that varies along the length of the slot between a bigger angle and a smaller angle that is at least 1° less than the bigger angle, and wherein the air has a tangential component that is corotational with the rotor.

Thus the air stream will emerge from the slot at different angles along the length of the slot. By this means it is possible to optimise the tangential velocity of the air at different positions along the slot, according to the location of each position relative to surrounding apparatus.

The presence of a strong tangential component to the air stream in part at least of each of the slots is desirable because it promotes the formation of a fibrous product having a uniform and low density. Accordingly the direction means should direct the air at an angle over part of the length of the slot that is corotational with the periphery and that is relatively big, namely at least 20°, usually at least 30° and often at least 40° to the axial direction. It is generally undesirable for it to be above about 50° or 65° because these bigger angles increase the difficulty of providing sufficient axial flow to carry the fibres away from the set of rotors, and generally the maximum angle is below 45°, often around 42°.

However these big angles have proved to be undesirable in some positions around each rotor, in that at these positions a more axial (and less tangential) air flow gives better results. Accordingly at these positions the air stream should emerge at a smaller angle. The smaller angle will generally be at least 10° less than the bigger angle. Suitable results are often obtained when the bigger angle is in the range 30° to 45° and the smaller angle is at least 10° less and is in the range 10° to 25°.

In a particularly important and preferred aspect of the invention the smaller angle is in the range 0° to 15°, often 0°-10° and preferably 0°-5°, most preferably 0°, over at least part of the length of at least one of the slots. In some instances the smaller angle may be a very small (e.g., 0°-5°) such that the tangential component of the air is counterrotational with the rotor.

One instance where a strong tangential component is undesirable is where the tangent to the rotating surface extends downwardly, for instance at an angle of ±45° to the vertical, because the imposition of this tangential air stream tends to blow the fibres downwards so that they may not mix properly with the binder, and may even be blown into the pit. Accordingly, it is desirable in these regions that the direction means should be angled at a smaller angle than at other parts of the slot.

In particular, it is often preferred that the lowermost pair of rotors should rotate in opposite directions with the tangents to the adjacent rotating surfaces both being directed downwards, and that there should be air slots around each of these rotors and that these air slots should extend between the adjacent parts of the rotors. If there is a strong tangential component in the air flow from both of these slots, this will provide a very strong downward force to the fibres being thrown off each of the final pair of rotors where they are close to one another, and thus is liable to lead to poor binder distribution and a particularly high loss of good quality fibres into the pit. By reducing the angle of the direction means in these regions, the air flow will have a stronger axial component and so will tend to blow the fibres more strongly on to the collecting surface.

Another position where the use of the bigger angle can be disadvantageous is when the tangent from a rotor extends vertically upwards ±45°, especially at a rotor at the top of the set. This is because the airstream will tend to throw the fibres upwards. They may strike the roof of the chamber and they may be thrown up away from the binder. Also, the upward air flow could, in some situations, cool the melt stream. Accordingly, at the upper end of the slot of such a rotor, it is preferred that the angle should be a smaller angle.

Another situation arises when the spinning chamber is relatively narrow, since the use of a bigger angle on the outermost part of the slots, adjacent the walls of the spinning chamber, may then tend to direct the fibres against the walls of the chamber, and so in these positions it would be desirable to have a smaller angle.

It is desirable that there should not be a sudden transition from the bigger angle to the smaller angle and so preferably there is a graduated transition. Usually most of the slot is at one angle and the remainder of the slot, usually at one end, is at the other angle, but if desired the angle may, for instance, start at the smaller angle, increase to the bigger angle and then reduce to the smaller angle.

In any slot where the angle does vary along the length, generally 10 to 90%, often 10 to 40%, is at the smaller angle with the remainder being at the bigger angle. Several different lower angles may be used. For instance part of the length of the slot, e.g., 10 to 30%, might be at an angle of zero, part at an angle of, for instance, 10° to 20°, and the remainder at an angle of, for instance, 30° to 45°.

Although the slot is preferably an annular, or part annular, duct that extends around the associated rotor and that has blades fitted in it to act as guides, it can alternatively be a series of adjacent orifices, with the walls of each orifice acting as the guides.

Generally each blade is rectilinear and is fitted within the slot at the desired angle, but some or all of the blades can be curved, in which event the angle will be defined, at least in part, by the angle of the discharge end of the blade.

Because of the capital investment and the labour involved in operating such a plant, it is highly desirable to increase its productivity. Prior art attempts at increasing productivity have included using a pair of fiberising means within the fiberising chamber as exemplified in U.S. Pat. Nos. 3,709,670 and 4,119,421. In both these patents the fiberising means are necessarily arranged symmetrically to avoid interference between their respective air flows. Neither of these systems is very effective, and both have the additional disadvantage that they require the construction of two opposite types of fiberising means so that the rotors can be arranged in the requisite mirror-image pattern. Replacement of the fiberising means is liable to be required relatively frequently because of the very aggressive conditions to which it is exposed, and so it is very inconvenient that anybody operating a plant as described in either of these patents would have to stock two different types of fiberising means to carry out such a replacement.

There is therefore still an urgent need to be able to increase the productivity of the plant without causing a reduction in product quality, and without making it necessary to stock two different types of fiberising needs.

Also according to the present invention apparatus is provided which comprises a plurality of fiberising means as described above and which are arranged in side by side relationship wherein each set of rotors is substantially identical in each of the fiberising means.

As a result of having the direction means directing the air at different angles within the same set of rotors, it is now possible to optimise the air flow at each part of each set. As a consequence of this, it is for the first time possible to optimise the air flows in one set of rotors in relation to the air flows in the adjacent set, and thus it is possible to obtain very good fiberising results even though the sets of rotors can be very close to one another and can be identical to one another.

By saying that the sets of rotors are identical to one another it is meant that they are interchangeable with one another without any adverse effect on the performance of the apparatus. Naturally there can be minor and insignificant differences between the sets. However, often the entire fiberising means is identical in this sense, so that a fiberising means comprising the housing, the rotors and the air slots around the rotors, is interchangeable with another fiberising means.

By means of this arrangement of the fiberising means it is possible to avoid interference between the air supplies in adjacent fiberising means.

The spacing between each set of rotors can be very close, for instance the horizontal spacing between the areas of adjacent rotors in the two sets may be 1 to 4, often 1 to 2 times the horizontal spacing of the adjacent rotors in one set.

The set of rotors can consist of just two rotors but generally it consists of three, or more usually four, rotors.

BRIEF DESCRIPTION OF THE DRAWINGS

The invention is illustrated by reference to the accompanying drawings in which.

Figure 1:
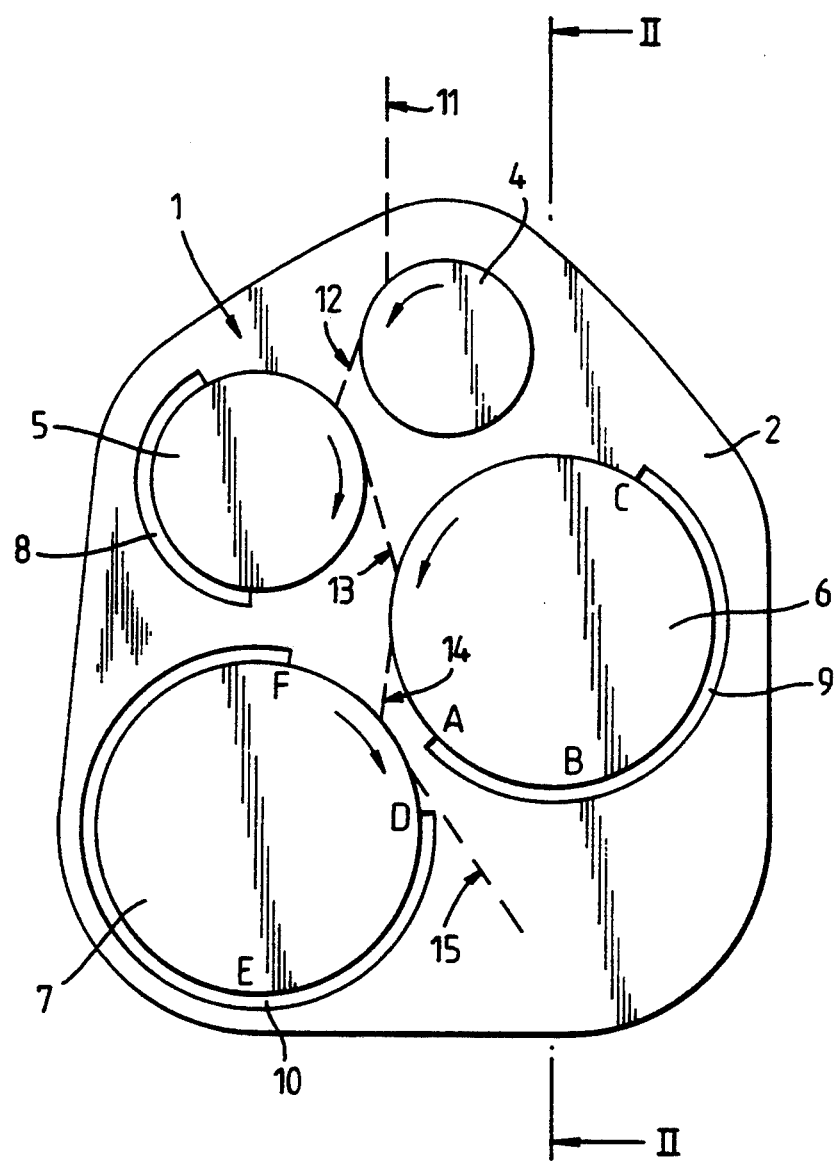
FIG. 1 is a front view of a set of rotors.

The apparatus consists of a set of rotors 1 mounted on the front face 2 of a housing 3. Each rotor is mounted in conventional manner on a driven axle that allows it to be rotated at high peripheral speed. The illustrated set consists of four rotors, a relatively small feed rotor 4 that rotates anti-clockwise, a first subsequent fiberising rotor 5 that rotates clockwise, a second subsequent fiberising rotor 6 that rotates anti-clockwise, and a third subsequent fiberising rotor 7 that rotates clockwise. The bearings and drive mechanisms are not shown. The bearings and drive mechanisms are not shown. Air slots 8, 9 and 10 are associated with, respectively, the subsequent rotors 5, 6 and 7, each slot extending around part only of the rotor. Generally each slot extends around at least ⅓ of the periphery of its associated rotor, generally around the outer part of the set of rotors. Generally it extends around not more than ⅔ or ¾ of the periphery.

Each slot leads from an air supply chamber within the housing.

Molten mineral melt is poured on to the rotor 4 along path 11 and the majority of it is thrown, along path 12, on to subsequent rotor 5. Some of the melt is fiberised off that rotor while the remainder is thrown along path 13 on to subsequent rotor 6. A significant amount of this is fiberised off rotor 6, mainly in the area where there is slot 9, but some is thrown along path 14 on to the subsequent rotor 7. A significant amount is fiberised in the general direction 15 but a large amount is also fiberised around the remainder of the rotor surface included within slot 10.

Since the slots 8, 9 and 10 do not extend around the entire periphery of each rotor, the air flow in the region of paths 12, 13 and 14 can be controlled and, indeed, can be substantially zero.

Within each slot blades 25 are mounted at an angle, relative to the axial direction of the associated rotor, that can be predetermined at a value ranging, typically, from zero to 42°. For instance, in slot 9 the angle in the region A to B can increase from 0° at A to about 20° at B and then the angle of the blades in the region B to C can be substantially uniform at 42°. Similarly, in slot 10 the angle can increase from about zero at D up to about 20° at E and can then increase and be substantially uniform throughout the region E to F at an angle of about 42°.

In slot 8, it may be preferred to have a lesser angle, typically a uniform angle of around 15° to 30°, often around 20° or 25°.

The inner edge 24 of each slot is preferably coaxial with the associated rotor and preferably has a diameter that is substantially the same as the associated rotor. Preferably the diameters are identical but the inner edge of the slot can have a slightly larger diameter but it is desirable that any such increase in diameter should be sufficiently small that a wall jet effect is still achieved as the air flows out of the slot and across the surface of the rotor. Accordingly if the slot has an inner diameter that is more than a few millimeters greater than the outer diameter of the rotor, it is generally desirable for the slot to direct the air stream as a slightly inwardly converging air stream so as to be directed at a small angle on to the surface and form a wall jet with it; WO 88/07980 is an example of such an arrangement.

It is desirable in the invention that the air flow has a wall jet, and this can easily be established by identifying the velocity profile adjacent to the surface. When a wall jet exists, the greatest velocity is close (e.g., within 10 mm) to the surface both at the rear edge (16) of the rotor and at the front edge (17) of the rotor.

Binder sprays 18 are mounted as a central nozzle on the front face of each rotor and eject binder into the fibres that are blown off the rotor. Instead of or in addition to this, separate binder sprays may be provided, for instance beneath or above the set of rotors and directed substantially axially.

The collecting chamber comprises a pit 20 having a double screw 21 that collects pearls and other fibre that drops into the pit and recycles them to the melt chamber. A conveyor 22 collects the fibres and carries them away from the spinners. Air is forced through a secondary air ring, for instance a plurality of orifices 23 arranged around the front face of the housing 2 and/or in and/or beneath the front face of the housing 2. The secondary air ring provides an axial air stream to promote the axial transport of the fibres away from the rotors and to control their rate of settlement and the intermixing with binder.

Figure 3:
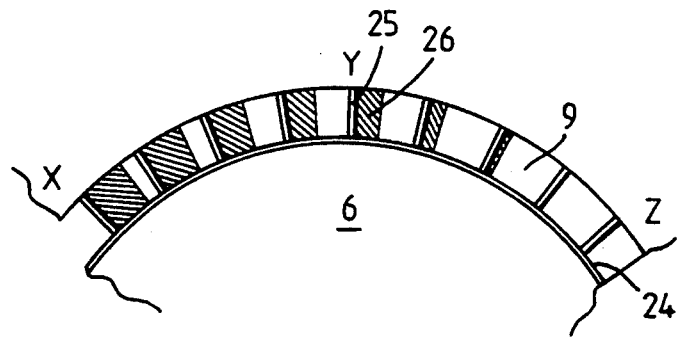
FIG. 3 is a detail of the slot around one of the rotors.

It will be seen from FIG. 3 that the inner edge 24 of the annular slot has substantially the same diameter as the outer edge of the periphery of rotor 6 and that the blades 25 are arranged substantially radially across the slot. Of course, if desired, they may be arranged at an angle. The leading edge of the blades is shown as 25, and the side face the blades is shown as 26. In FIG. 3, position X corresponds approximately to position C in FIG. 1, i.e., where the blades are arranged at about 42°, position Y corresponds to position B, i.e., where the blades are arranged at around 20°, and position A corresponds to position Z, i.e., where the blades are at 0° and thus promote truly axial flow of the air.

42°, or thereabouts, is the preferred angle for the blades as, in practice, it provides a tangential air flow through the slot that is at least half of the tangential velocity of the rotor, and so optimises the formation of fibres in the region of, for instance, B to C on rotor 6. For instance a typical peripheral velocity of the rotor 6, is from 80 to 120 meters per second; a typical air velocity through the slot is 80 to 140 or 200 meters per second: a typical axial component of the air velocity is 50 to 130 meters per second; and a typical tangential component of the air velocity is 50 to 120 meters per second. In fact, when the air velocity through the slot is 80 to 140 meters per second and the blades are at about 42° the axial component of the velocity is 60 to 104 meters per second and the tangential component is about 53 to 94 meters per second.

The rotors can all be of conventional size, typically having diameters in the range 180 to 400 mm, with rotor 4 generally being smallest, rotor 5 generally being in the range 220 to 300 mm and rotors 6 and 7 generally being in the range 300 to 400 mm. The width of the slot is generally in the range 5 to 40, generally around 5 to 20, mm.

The described process gives a more uniform product (at both high and low fibre densities) and allows a significant increase in production capacity.

Figure 2:
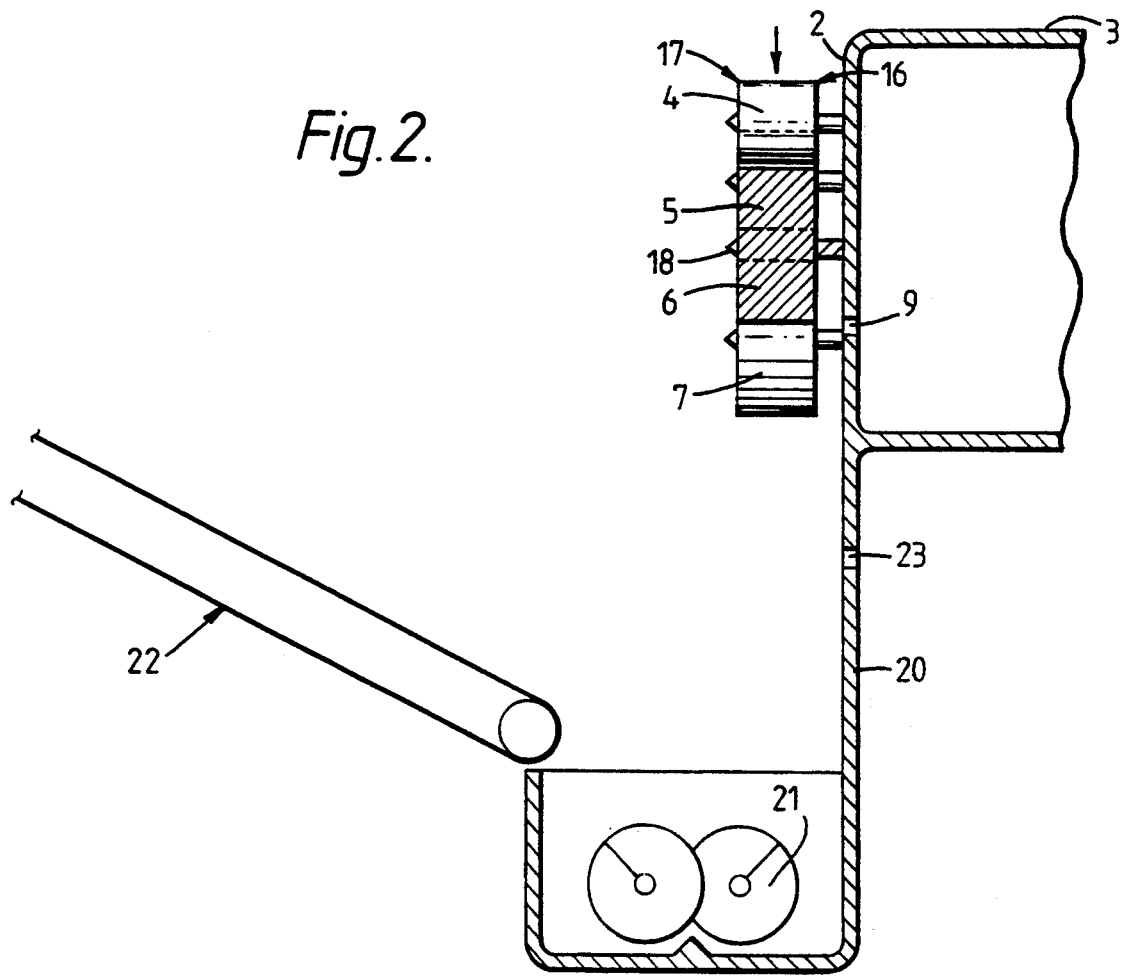
FIG. 2 is a cross-section on the line II—II through the set of rotors in FIG. 1 and through the collecting chamber in which they are positioned in use.

Although only a single air inlet 23 is illustrated in FIG. 2, there may be a plurality of individually mounted air slots mounted beneath the rotors that direct air in a generally forward direction.

Figure 4:
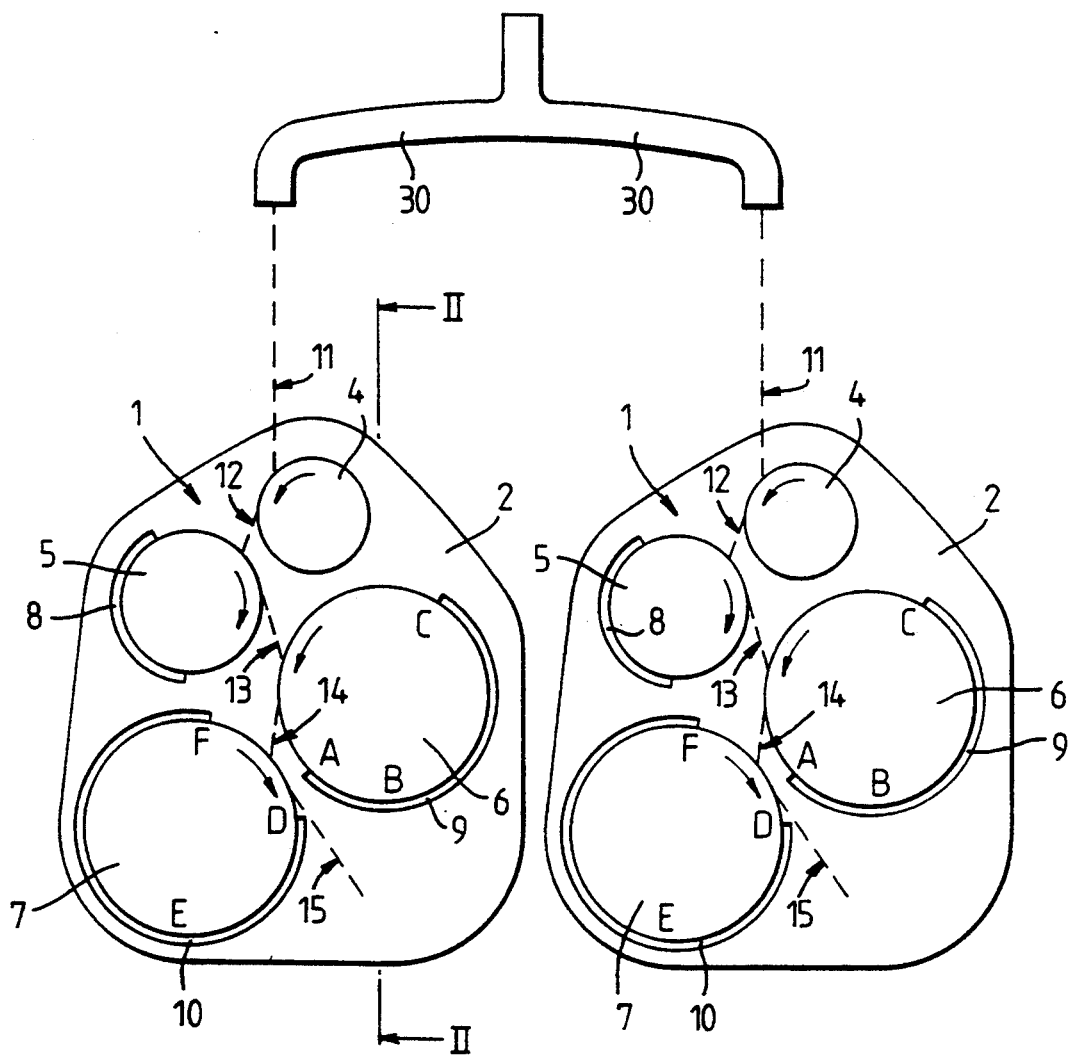
FIG. 4 is a front view of a pair of a set of rotors (the slots are not shown).

In FIG. 4, the reference numbers indicate the same features of the apparatus as FIGS. 1-3. Separate air channels 30 are provided for each set of rotors, and lead from the melt furnace.

Although we have referred above to a single air slot, the air slot can consist of inner and outer slots, wherein the inner slot provides an inner blast of air that is sufficiently close to the surface to form a wall jet and the outer slot provides an outer blast of air that merges with the inner blast so as to give a wall jet effect to the combined blasts. Generally the inner surface of the outer slot is not more than 20 or 30 mm radially from the surface of the rotor and generally it is within 10 mm. Preferably the inner and outer blasts have different angles of travel at the time of exiting from their slots. For instance the inner blast can be wholly axial and the outer slot can conta the direction means to cause the outer blast to have the desired tangential component.

The following is an example of the apparatus according to the present invention:

A fiberising chamber has a width of 1.8–2.0 meters, and mounted therein is a set of four rotors, numbered according to the drawings as 5, 6 and 7. Details of the sizes of the rotors, their velocities, and the velocities of air used are set out in Table 1. All air velocities are measured by a hot-wire technique.

TABLE 1

| Wheel | RPM | Diameter of rotor (mm) | V periph rotor (m/s) | V tang air (m/s) | V air slot (m/s) | Blade angles |
|---|---|---|---|---|---|---|
| 5 | 5500 | 250 | 72 | 65 | 140 | $\alpha$ 24° |
| 6 | 6500 | 330 | 111 | 0–65 | 140 | $\alpha_{AB}$ 0–24° |
|   |      |     |     | 65–82 |    | $\alpha_{BC}$ 24–42° |
| 7 | 7000 | 330 | 120 | 0–65 | 140 | $\alpha_{DE}$ 0–24° |
|   |      |     |     | 65–82 |    | $\alpha_{EF}$ 25–42° |

V periph rotor = peripheral velocity of rotor
V tang air = tangential velocity of air
V air slot = velocity of air through the slot The amount of melt consumed; the yield of wool produced; and the loss of wool and the amount of unfiberised material on the screw were measured over a eight hour period and the mean-values of each of these are set out below.

The amount of melt consumed (or melting capacity): 7000 kg/hour.
Yield of wool: 87%
Loss of wool and amount of unfiberised material on the screw: 910 kg/hour.

The following is a Comparative Example detailing spinning apparatus for the production of mineral wool which does not have the graduated angle arrangement of the present invention.

A fiberising chamber has a width of 1.8–2.0 meters and has a set of four rotors mounted therein. Three of these rotors are fiberising rotors, which are denoted as 5, 6 and 7 in Table 2, in compliance with the Example of the invention described above. Table 2 shows details of the rotors and the air velocities. All air velocities are measured by a hot-wire technique.

TABLE 2

| Rotor | RPM of rotor | Diameter of rotor (mm) | V periph rotor (m/s) | V tang air (m/s) | V air slot (m/s) | Blade angles |
|---|---|---|---|---|---|---|
| 5 | 5500 | 250 | 72 | 65 | 140 | 24° |
| 6 | 6500 | 330 | 111 | 73 | 140 | 36° |
| 7 | 7000 | 330 | 120 | 82 | 140 | 42° |

The abbreviations for the velocities are the same as for Table 1.

Production data was again obtained over an eight hour period, and mean-values calculated; these are set out below. Amount of melt (or melting capacity) 5000 kg/hour.
Yield of wool: 76%
Loss of wool and amount of unfiberised material in the screw: 1200 kg/hour.

In summary, the apparatus according to the invention achieves a higher effectivity with a higher capacity, and a results in a lower loss of wool and unfiberised material as compared to the apparatus embodied in the Comparative Example.

Both sets of apparatus result in a mineral wool having 29–33% shot size greater than 63 $\mu$m. However, the product obtained from the apparatus according to the invention is visually more homogeneous, with fewer wool-tufts having no binder in them; this is due to a better distribution of the binder achieved by the apparatus of the invention.

We claim:

1. Apparatus for the formation of mineral wool fibres comprising:
   a housing having a front face;
   means for converting mineral melt into mineral wool fibres comprising a set of rotors each mounted on the front face of the housing for rotation about a different substantially horizontal axis, the rotors arranged such that mineral melt poured on to the periphery of the top rotor in the set of rotors that is rotating is thrown on to the periphery of at least the subsequent rotor in the set and mineral wool fibres are thrown off at least the subsequent rotor;
   means for collecting the mineral wool fibres comprising, associated with the at least subsequent rotor, an air supply slot extending through the front face of the housing around and close to that rotor for discharging an air blast close to and substantially parallel to the periphery of the rotor with an axial component for carrying the mineral wool fibres axially off that periphery; and
   direction means for directing the discharged air at a selected angle relative to the axial direction, wherein the direction means in at least the air supply slot associated with the final rotor in the set is arranged to direct the air at an angle to the axial direction that varies along the length of the air supply slot between a bigger angle of up to 65° and a smaller angle that is at least 10° less than the bigger angle, and wherein the air has a tangential component that is corotational with the rotor.

2. The apparatus according to claim 1 wherein each of the air supply slots extends around part only of the peripheral surface of its associated rotor and does not extend substantially between that rotor and the adjacent subsequent rotor.

3. The apparatus according to claim 2 in which the final rotors in the set comprise a pair of counter-rotating rotors that rotate in a direction such that the tangents of rotation of the closest parts of the rotors extend downwardly, and the lower angle is in the part of each of the air supply slots where the tangents of rotation extend downwardly.

4. The apparatus according to claim 3 in which the set of rotors consists of an initial rotor and three subsequent rotors and the direction means are arranged to direct the air at an angle to the axial direction that varies along the length of the air supply slots associated with each of the third and fourth rotors.

5. The apparatus according to claim 1 including means for spraying a binder on to the fibres as they are carried axially off the or each rotor.

6. The apparatus according to claim 5 in which the means for spraying binder comprise a binder spray mounted coaxially with the rotor.

7. The apparatus according to claim 1 in which the means for collecting the mineral wool fibres comprise a conveyor that carries them away from the set of rotors.

8. The apparatus according to claim 7 wherein there is a pit in front of the set of rotors and before the conveyor, and there are means for recycling to a melting furnace the shot and wool that collects in the pit.

9. The apparatus according to claim 1 in which the higher angle is from 30° to 50°.

10. The apparatus according to claim 9 in which the lower angle is 10° to 25°.

11. The apparatus according to claim 9 in which the lower angle is from 0° to 10°.

12. The apparatus according to claim 1 wherein the air supply slot comprises an inner slot close to the surface of the rotor and an outer slot which is no greater than 30 mm radially outwards from the surface of the rotor.

13. An arrangement for the formation of mineral wool fibres comprising a plurality of apparatus for the formation of mineral wool fibres, each apparatus comprising:

a housing having a front face;

means for converting mineral melt into mineral wool fibres comprising a set of rotors each mounted on the front face of the housing for rotation about a different substantially horizontal axis, the rotors arranged such that mineral melt poured on to the periphery of the top rotor in the set of rotors that is rotating is thrown on to the periphery of at least the subsequent rotor in the set and mineral wool fibres are thrown off at least the subsequent rotor;

means for collecting the mineral wool fibres comprising, associated with the at least subsequent rotor, an air supply slot extending through the front face of the housing around and close to that rotor for discharging an air blast close to and substantially parallel to the periphery of the rotor with an axial component for carrying the mineral wool fibres axially off that periphery; and direction means for directing the discharged air at a selected angle relative to the axial direction, wherein the direction means in at least the air supply slot associated with the final rotor in the set are arranged to direct the air at an angle to the axial direction that varies along the length of the air supply slot between a higher angle of up to 65° and a smaller angle that is at least 10° less than the bigger angle, and wherein the air has a tangential component that is corotational with the rotor.

14. A method for preparing mineral wool fibres comprising the steps of:

(a) providing a housing having a front face;

(b) converting mineral melt into mineral wool fibres by means comprising a set of rotors each rotor mounted on the front face of the housing for rotation about a different substantially horizontal axis and arranged such that when the rotors are rotating, mineral melt poured on to the periphery of the top rotor in the set is thrown on to the periphery of the subsequent rotor, or each subsequent rotor in sequence, in the set and mineral wool fibres are thrown off the or each subsequent rotor;

(c) collecting the mineral wool fibres by means comprising, associated with the at least subsequent rotor, an air supply slot extending through the front face of the housing around and close to that rotor for discharging an air blast close to and substantially parallel to the periphery of the rotor with an axial component for carrying the mineral wool fibres axially off that periphery; and (d) selecting the angle of the discharged air relative to the axial direction by direction means, wherein the direction means in at least the air supply slot associated with the final rotor in the set are arranged to direct the air at an angle to the axial direction that varies along the length of the air supply slot between a higher angle of up to 65° and a smaller angle that is at least 10° less than the bigger angle, and wherein the air has a tangential component that is corotational with the rotor.

* * * * *